(12) United States Patent
Kong et al.

(10) Patent No.: US 9,189,902 B2
(45) Date of Patent: Nov. 17, 2015

(54) ENCODED PICTURE IDENTIFICATION

(75) Inventors: Wei Jun Kong, Bethpage, NY (US);
Geoffrey R. Hird, Cupertino, CA (US)

(73) Assignee: CA, Inc., New York, NY (US)

( * ) Notice: Subject to any disclaimer, the term of this patent is extended or adjusted under 35 U.S.C. 154(b) by 72 days.

(21) Appl. No.: 13/398,133

(22) Filed: Feb. 16, 2012

(65) Prior Publication Data

US 2013/0214043 A1  Aug. 22, 2013

(51) Int. Cl.
*G06K 7/00* (2006.01)
*G07C 9/00* (2006.01)
*G06K 19/06* (2006.01)

(52) U.S. Cl.
CPC ...... *G07C 9/00079* (2013.01); *G06K 19/06103* (2013.01)

(58) Field of Classification Search
USPC .................. 235/375, 379, 380, 462
See application file for complete search history.

(56) References Cited

U.S. PATENT DOCUMENTS

| | | | |
|---|---|---|---|
| 2006/0075255 A1* | 4/2006 | Duffy et al. ..................... | 713/186 |
| 2008/0224823 A1* | 9/2008 | Lawson et al. .................. | 340/5.8 |
| 2010/0044430 A1* | 2/2010 | Song et al. ..................... | 235/379 |
| 2012/0138679 A1* | 6/2012 | Doyle ............................ | 235/380 |

FOREIGN PATENT DOCUMENTS

| | | | |
|---|---|---|---|
| GB | 2378292 A | * | 2/2003 |
| WO | WO 2013032483 A1 | * | 3/2013 |

OTHER PUBLICATIONS

"Microsoft Biometric ID Technology", [Online]. Retrieved from the Internet: <URL: http://www.microsoft.com/products/msbit/default.mspx>, (accessed Feb. 15, 2012), 1 pg.

"Microsoft Biometric ID Technology—ID Creation", [Online]. Retrieved from the Internet: <URL: http://www.microsoft.com/products/msbit/HowItWorksCreation.mspx>, (accessed Feb. 15, 2012), 1 pg.

"Microsoft Biometric ID Technology—ID Verification", [Online]. Retrieved from the Internet: <URL: http://www.microsoft.com/products/msbit/HowItWorksVerification.mspx>, (accessed Feb. 15, 2012), 1 pg.

* cited by examiner

*Primary Examiner* — Matthew Mikels
(74) *Attorney, Agent, or Firm* — Gilliam IP PLLC

(57) ABSTRACT

An identification device includes a computer readable code. The computer readable code includes data relating to one or more pictures of a person and identity data for the person. The computer readable code is readable by a device reader, and the device reader is configured to interpret the computer readable code and to display the picture of the person using the computer readable code data relating to the picture of the person.

26 Claims, 3 Drawing Sheets

ENCODED PICTURE IDENTIFICATION

TECHNICAL FIELD

The present disclosure relates to encoded picture identification, and in an embodiment, but not by way of limitation, computer encoded picture identification.

BACKGROUND

Barcode and quick response (QR) codes can be encoded with information, and this information can be gleaned by reading the bar code or QR code with a reader. While bar codes and QR codes have historically been used on paper and other such substrates, with the advent of smart phones and other such devices, bar codes and QR codes can be stored, displayed, and read electronically. Consequently, bar codes, and QR codes in particular, can store a relatively large amount of digital information that can be optically communicated between common devices. Additionally, by using public-private key digital signatures on bar code and QR code content, authenticity can be established.

SUMMARY

In an embodiment, an identification device includes a computer readable code. The computer readable code includes data relating to one or more pictures of a person, identity data for the person, and a digital signature verifying the authenticity of the identification device. The computer readable code is readable by a device reader, and the device reader is configured to interpret the computer readable code and to display the picture of the person using the computer readable code data relating to the picture of the person, and the device reader may verify the authenticity of the identification device based on the signature.

In another embodiment, an identification system includes an identification device including a computer readable code. The computer readable code includes data relating to one or more pictures of a person, identity data for the person, and a digital signature verifying the authenticity of the identification device. The system also includes a device reader, wherein the device reader is configured to interpret the computer readable code and to display the picture of the person using the computer readable code data relating to the picture of the person, and the device reader may verify the authenticity of the identification device based on the signature.

In yet another embodiment, an identification device includes a computer readable code. The computer readable code includes data relating to one or more pictures of a person, an animal, or an object, identity data for the person, animal, or object, and a digital signature verifying the authenticity of the identification device. The computer readable code is readable by a device reader, and the device reader is configured to interpret the computer readable code and to display the picture of the person, animal, or object using the computer readable code data relating to the picture of the person, animal or object, and the device reader may verify the authenticity of the identification device based on the signature.

DETAILED DESCRIPTION

Figure 1:
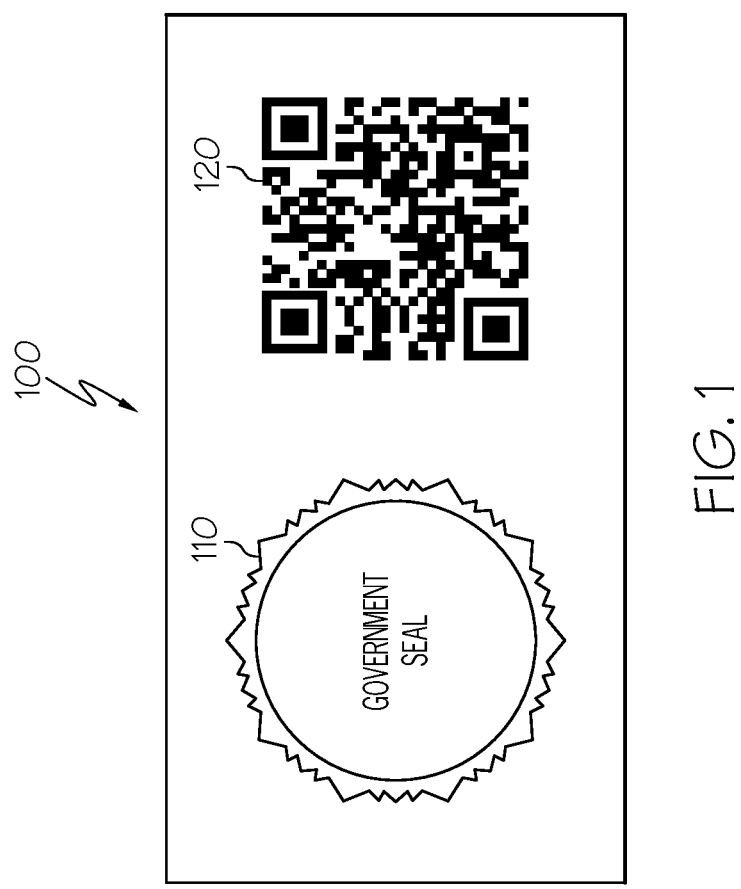
FIG. 1 illustrates an example of an encoded picture identification device.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. Furthermore, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

In an embodiment, picture encoded identification devices can be used as tamper-proof identity documents. Currently, identification documents such as drivers' licenses and passports are susceptible to forgery. Though there are already identity systems that store, as part of the identity information, the biometric information for a person, there are still difficulties with special equipment that is required to validate the user. Also, some existing technologies rely on access to a central server to get additional information about the person. In another embodiment, a picture encoded photographic ID can be used at a point of sale (store, restaurant, etc.). These documents, like drivers' licenses and passports, can be forged. However, a QR code containing a signed portrait of a person can be displayed on a smart-phone, and read on a merchant's smart-phone or other device. In this embodiment, locally verifiable binary information can be exchanged using ubiquitous consumer items.

QR Codes and barcodes can store up to 4 kilobytes of information. Consequently, up to three images can be stored with sufficient resolution to achieve good facial feature acquisition levels. In fact, a couple hundred bytes give a reasonable image. Of course, this uses image compression such as JPEG or DjVu. Short video or voice can also be stored in the bar code and QR code. Digital signatures can be made with RSA or ECC, and accompany the image or other data. An ECC signature from a 160-bit key occupies 40 bytes. Multiple QR codes could be used for large payloads. Additionally, an X.509 signer certificate, and possibly a chain, could be included in the code. Standard formats like PKCS #7 permit omitting the certificate, or replacing it with the serial number, for size reasons. In an embodiment, signer information is omitted, and the verifying party chooses the trusted root certificate based on the transaction context. When a signature is used, the signed data binds all appropriate information, for example name, social security number, address, images, video, voice sample, privileges, and status.

The use of picture encoded identity documents is particularly valuable in situations where there is no access to a central server, or there is no policy to store the information in a central server, but validation of the user's identity is necessary. The printing of the document can be done inexpensively with only a printer and without the need of special devices or media. Validation of such a document can be done by smart phones that do not have access to the Internet. These documents could be used in temporarily-issued government documents in cases for refugee camps and disaster stricken areas where there is a need for a system to create secure identity documents that is cost effective, and where access to the Internet is limited. Such an identity document is also another form of security for a permanent identity document because of the cryptographic security. Again, the use of such a QR code displayed on a smart phone at point of sale can reduce fraud without requiring changes to payment system protocols. Indeed, a driver's license can now be a signed QR code on a smart-phone, and be a more secure document.

FIG. 1 illustrates an example of an encoded picture identification device 100. It can include an indication of the issuing authority, such as a government seal 110, and a bar code, QR code, or other computer-readable code 120.

Figure 2:
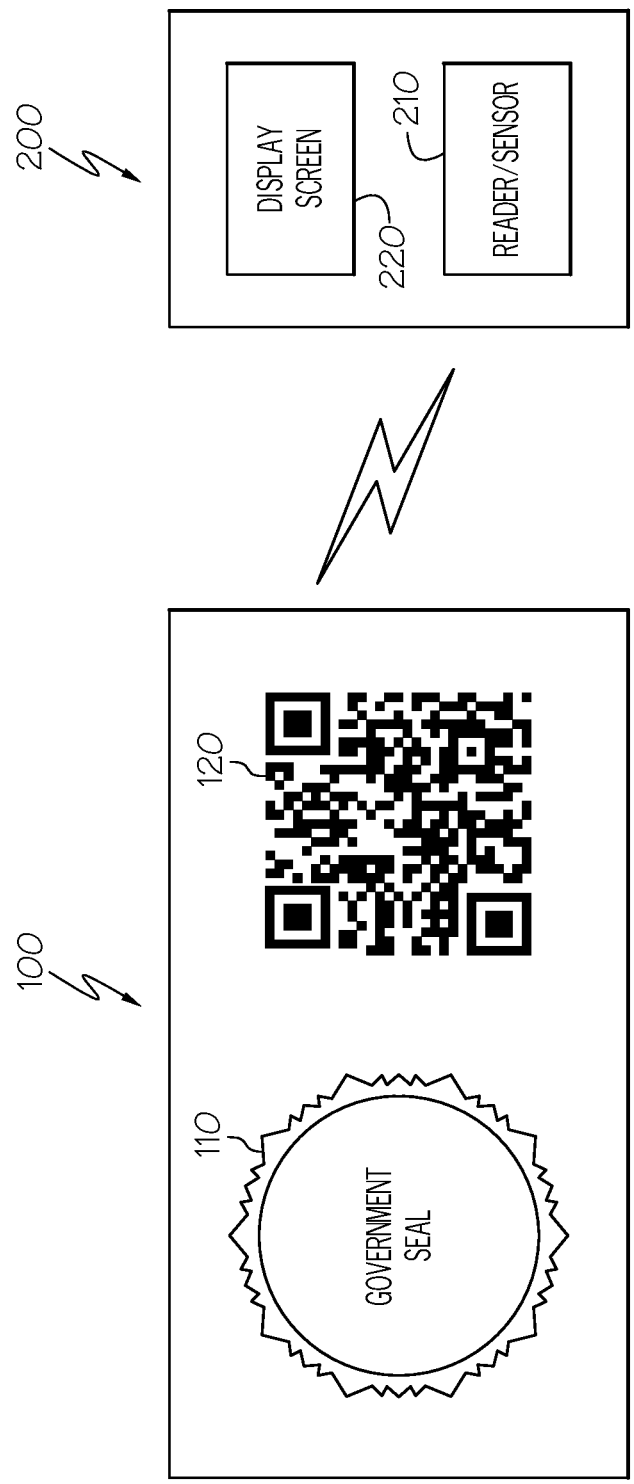
FIG. 2 illustrates an example of a system that can read an encoded picture identification device and display the picture and other information on a display unit.

FIG. 2 illustrates an example of a system that can read an encoded picture identification device and display the picture and other information on a display unit. Specifically, the system includes a reader 200 that has a reader/sensor 210 and a display screen 220. The reader/sensor 210 scans the QR code 120, and displays on the display screen 220 an identification picture of a person and other identifying data about that person.

Figure 3:
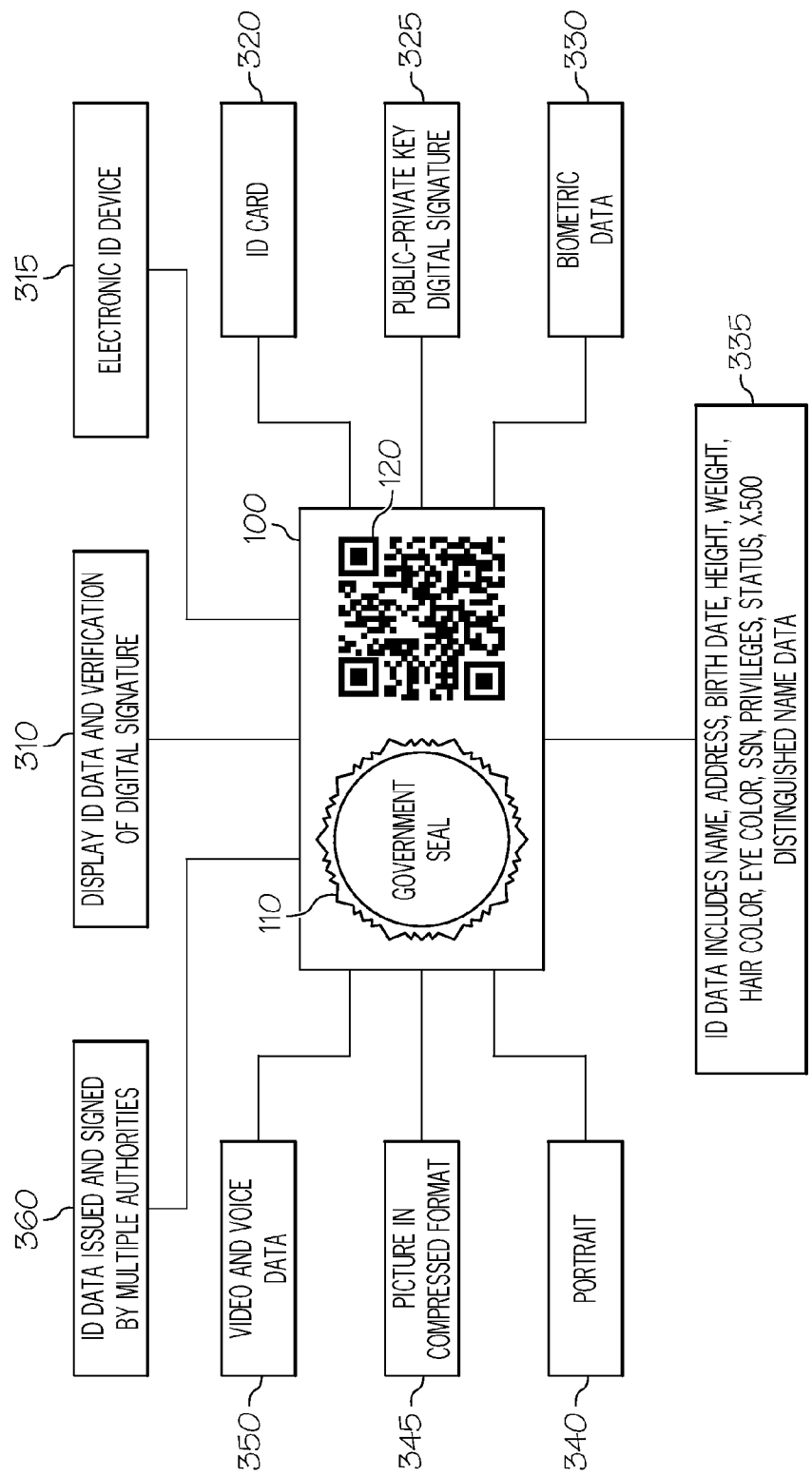
FIG. 3 illustrates features of an encoded picture identification system.

FIG. 3 illustrates features of an encoded picture identification system. These features are discussed in more detail below in connection with a discussion of the plurality of example embodiments.

Example Embodiments

Several embodiments and sub-embodiments are disclosed below, and it is envisioned that any embodiment can be combined with any other embodiment or sub-embodiment.

Example No. 1 is an identification device including a computer readable code. The computer readable code includes data relating to one or more pictures of a person and identity data for the person. The computer readable code is readable by a device reader, and the device reader is configured to interpret the computer readable code and to display the picture of the person using the computer readable code data relating to the picture of the person.

Example No. 2 includes the features of Example No. 1, and optionally includes an identification device wherein the computer readable code includes a digital signature verifying the authenticity of the identification device; and the device reader may verify the authenticity of the identification device based on the signature.

Example No. 3 includes the features of Example Nos. 1-2, and optionally includes an identification device wherein the computer readable code includes one or more of a bar code and a quick response (QR) code.

Example No. 4 includes the features of Example Nos. 1-3, and optionally includes, as illustrated in FIG. 3 at 310, an identification device wherein the device reader is configured to interpret the computer readable code and to display the identity data for the person and a verification of the digital signature.

Example No. 5 includes the features of Example Nos. 1-4, and optionally includes, as illustrated in FIG. 3 at 315, an identification device including an electronic identification device that is displayable on an electronic display unit.

Example No. 6 includes the features of Example Nos. 1-5, and optionally includes, as illustrated in FIG. 3 at 320, an identification device including an identification card.

Example No. 7 includes the features of Example Nos. 1-6, and optionally includes, as illustrated in FIG. 3 at 325, an identification device wherein the digital signature includes a public-private key digital signature.

Example No. 8 includes the features of Example Nos. 1-7, and optionally includes, as illustrated in FIG. 3 at 330, an identification device wherein the identity data for the person includes biometric data. The biometric data can include for example a voice recording, fingerprints, and an iris scan.

Example No. 9 includes the features of Example Nos. 1-8, and optionally includes, as illustrated in FIG. 3 at 335, an identification device wherein the identity data for the person comprises one or more of a name, an address, a date of birth, a height, a weight, a hair color, an eye color, a social security number, one or more privileges, a status, and X.500 Distinguished Name data. The privileges can include for example access to one or more restricted areas. The status can include for example employment status.

Example No. 10 includes the features of Example Nos. 1-9, and optionally includes, as illustrated in FIG. 3 at 340, an identification device wherein the picture of the person comprises a portrait of the person.

Example No. 11 includes the features of Example Nos. 1-10, and optionally includes, as illustrated in FIG. 3 at 345, an identification device wherein the picture of the person comprises compressed data.

Example No. 12 includes the features of Example Nos. 1-11, and optionally includes, as illustrated in FIG. 3 at 350, an identification device wherein the computer readable code includes one or more of video data and voice data.

Example No. 13 includes the features of Example Nos. 1-12, and optionally includes, as illustrated in FIG. 3 at 360, an identification device of claim 1 configured to read and verify identity data for one or more identities, and to read and verify non-identity data, wherein one or more subsets of the identity data and non-identity data are signed and issued by multiple authorities.

Example No. 14 is an identification system that includes an identification device and a device reader. The identification device includes a computer readable code, and the computer readable code includes data relating to one or more pictures of a person and identity data for the person. The device reader is configured to interpret the computer readable code and to display the picture of the person using the computer readable code data relating to the picture of the person.

Example No. 15 includes the features of Example No. 14, and optionally includes an identification system wherein the computer readable code comprises a digital signature verifying the authenticity of the identification device; and the device reader may verify the authenticity of the identification device based on the signature.

Example No. 16 includes the features of Example Nos. 14-15, and optionally includes an identification system wherein the computer readable code includes one or more of a bar code and a quick response (QR) code.

Example No. 17 includes the features of Example Nos. 14-16, and optionally includes, as illustrated in FIG. 3 at 310, an identification system wherein the device reader is configured to interpret the computer readable code and to display the identity data for the person and a verification of the digital signature.

Example No. 18 includes the features of Example Nos. 14-17, and optionally includes, as illustrated in FIG. 3 at 315, an identification system wherein the identification device comprises an electronic identification device that is displayable on an electronic display unit.

Example No. 19 includes the features of Example Nos. 14-18, and optionally includes, as illustrated in FIG. 3 at 320, an identification system wherein the identification device includes an identification card.

Example No. 20 includes the features of Example Nos. 14-19, and optionally includes, as illustrated in FIG. 3 at 325, an identification system wherein the digital signature includes a public-private key digital signature.

Example No. 21 includes the features of Example Nos. 14-20, and optionally includes, as illustrated in FIG. 3 at 330, an identification system wherein the identity data for the person comprise biometric data.

Example No. 22 includes the features of Example Nos. 14-21, and optionally includes, as illustrated in FIG. 3 at 335, an identification system wherein the identity data for the person comprise one or more of a name, an address, a date of birth, a height, a weight, a hair color, an eye color, a social security number, one or more privileges, a status, and X.500 Distinguished Name data.

Example No. 23 includes the features of Example Nos. 14-22, and optionally includes, as illustrated in FIG. 3 at 340, an identification system wherein the picture of the person comprises a portrait of the person.

Example No. 24 includes the features of Example Nos. 14-23, and optionally includes, as illustrated in FIG. 3 at 345, an identification system wherein the picture of the person comprises compressed data.

Example No. 25 includes the features of Example Nos. 14-24, and optionally includes, as illustrated in FIG. 3 at 350, an identification system wherein the computer readable code comprises one or more of video data and voice data.

Example No. 26 includes the features of Example Nos. 14-25, and optionally includes, as illustrated in FIG. 3 at 360, an identification system configured to read and verify identity data for one or more identities, and to read and verify non-identity data, wherein one or more subsets of the identity data and non-identity data are signed and issued by multiple authorities.

Example No. 27 is an identification device. The identification device includes a computer readable code. The computer readable code includes data relating to one or more pictures of a person, an animal, or an object, and identity data for the person, animal, or object. The computer readable code is readable by a device reader, and the device reader is configured to interpret the computer readable code and to display the picture of the person, animal, or object using the computer readable code data relating to the picture of the person, animal or object.

Example No. 28 includes the features of Example No. 27, and optionally includes an identification device including a computer readable code that includes a digital signature verifying the authenticity of the identification device; and the device reader may verify the authenticity of the identification device based on the signature.

Thus, an example encoded picture identification system has been described. Although specific example embodiments have been described, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract is provided to comply with 37 C.F.R. §1.72(b) and will allow the reader to quickly ascertain the nature and essence of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate example embodiment.

The invention claimed is:

1. An identification device comprising:
a barcode;
wherein the barcode comprises:
a cryptographically signed picture of a person encoded in the barcode as data; and
wherein the barcode data is readable by a device reader to authenticate the identification device and generate a display of the picture of the person from the data encoding the cryptographically signed picture of the person.

2. The identification device of claim 1, wherein the picture encoded in the barcode is signed with a digital signature.

3. The identification device of claim 1, wherein the barcode comprises a QR code.

4. The identification device of claim 1, wherein the identification device comprises an electronic identification device that is displayable on an electronic display unit.

5. The identification device of claim 1, wherein the identification device comprises an identification card including a government seal.

6. The identification device of claim 2, wherein the digital signature comprises a public-private key digital signature.

7. The identification device of claim 1, wherein the barcode further comprises identity data for the person comprising biometric data including one or more of a voice recording, a fingerprint, and an iris scan.

8. The identification device of claim 1, wherein the barcode further comprises identity data for the person comprise one or more of a name, an address, a date of birth, a height, a weight, a hair color, an eye color, a social security number, one or more privileges, a status, and X.500 Distinguished Name data.

9. The identification device of claim 1, wherein the picture of the person comprises a portrait of the person.

10. The identification device of claim 1, wherein the picture of the person comprises compressed data.

11. The identification device of claim 1, wherein the barcode comprises one or more of video data and voice data.

12. An identification device comprising:
a barcode;
wherein the barcode comprises:
  a cryptographically signed picture of a person encoded in the barcode as data; and
  identity data for the person;
wherein the barcode data are readable by a device reader to authenticate the identification device and generate a display of the picture of the person based on the data encoding the cryptographically signed picture of the person.

13. The identification device of claim 12, wherein the picture encoded in the barcode is signed with a digital signature.

14. A device reader comprising:
a processor;
an input sensor;
a display unit; and
a computer readable medium;
wherein the computer readable medium comprises instructions that when executed by the processor execute a transaction comprising:
  reading a barcode, the barcode encoding cryptographically signed image of a person;
  decoding the barcode to authenticate the barcode via the cryptographically signed image; and
  displaying the image of the person on the display decoding from data encoding the cryptographically signed image of the person.

15. The device reader of claim 14, wherein the barcode is part of an identification device.

16. The device reader of claim 15, wherein the cryptographically signed image comprises a digital signature; and comprising instructions for verifying authenticity of the identification device based on the signature and context of the transaction.

17. The device reader of claim 16, comprising instructions for decoding the barcode and for displaying identity data for the person and a verification of the digital signature.

18. The device reader of claim 15, wherein the identification device comprises an electronic identification device that is displayable on an electronic display unit.

19. The device reader of claim 15, wherein the identification device comprises an identification card.

20. The device reader of claim 16, wherein the digital signature comprises a public-private key digital signature.

21. The device reader of claim 14, wherein the barcode further comprises encoded identity data for the person comprising biometric data including one or more of a voice recording, a fingerprint, and an iris scan.

22. The device reader of claim 14, the barcode further comprises encoded identity data for the person comprising one or more of a name, an address, a date of birth, a height, a weight, a hair color, an eye color, a social security number, one or more privileges, a status, and X.500 Distinguished Name data.

23. The device reader of claim 14, wherein the image of the person comprises a portrait of the person.

24. The device reader of claim 14, wherein the image of the person comprises compressed data.

25. The device reader of claim 14, wherein the barcode comprises one or more of video data and voice data.

26. The device reader of claim 14, wherein the device reader is configured to read and verify identity data for one or more identities, and to read and verify non-identity data, wherein one or more subsets of the identity data and non-identity data are signed and issued by multiple authorities.

* * * * *